Inventors:
Richard R. Steingas
Edward M. Gaul
By: John J. Kowalik
Atty.

United States Patent Office 3,486,316
Patented Dec. 30, 1969

3,486,316
MOBILE SHAKER AND HARVESTING MACHINE
Richard R. Steingas and Edward M. Gaul, Napperville, Ill., assignors to International Harvester, Company, a corporation of Delaware
Original application Oct. 15, 1964, Ser. No. 404,022, now Patent No. 3,362,145, dated Jan. 9, 1968. Divided and this application Apr. 5, 1967, Ser. No. 646,779
Int. Cl. A01g *19/06*
U.S. Cl. 56—329                                     3 Claims

ABSTRACT OF THE DISCLOSURE

A mobile fruit harvester having an inclined surface disposed for catching fruit shaken from a tree. A first conveyor receives fruit from the inclined surface and includes a roller assembly for separating debris from the fruit. An elevator conveys the fruit upwardly to a second conveyor disposed above the first conveyor and which conveys the fruit past a work station and then to a collection bin on the harvester. Tree shaker mechanisms are carried on the harvester for detachable clamping on the limbs of a tree to be harvested.

---

This application is a division of applicants' co-pending application Ser. No. 404,022, filed Oct. 15, 1964 and now U.S. Patent No. 3,362,145.

The instant invention relates to mechanisms employed in harvesting tree crops, such as fruit and nuts and the like.

Improvements in the instant art concern themselves with essentially two aspects. One relates to mechanisms for catching and gathering fruit and nuts and the like which have been dislodged from the plants on which they grow. The other relates to means for shaking fruit and nuts and the like from plants into a catcher or gatherer. Several devices which heretofore have combined a fruit gatherer or catching mechanism with a tree shaker mechanism are cumbersome because of mere physical rather than synergetic connection between the two mechanisms.

Harvesting most tree crops, according to conventional practice, comprises shaking fruit and the like from its tree and permitting it to fall into an enlarged catcher which is disposed below the plant being harvested. From such catcher, the fallen crop is delivered by any of suitable diverse means into a container at a collection station. Generally, debris is gathered and conveyed to the container at the collection station together with the harvested crop.

From the collection station the harvested crop together with debris collected therewith is transported to a sorting or culling station. At the sorting station the crop carrying container may be emptied onto a conveyor along which operators are stationed. They perform various operations which may include cleaning, grading and culling and inspection prior to packaging and crating for shipment.

In conventional practice for harvesting fruit and the like, a portable catcher is employed. It is adapted to be connected to a vehicle, such as a tractor or the like, which transports it from place to place. Most of the prior improcements in catchers have dealt with means for efficiently spreading and collapsing the catchers, and also with minimizing the structural components necessary efficiently to support such catchers.

Analysis of the foregoing discloses that efficiencies may be effectuaated by improved utilization of time during harvesting. For example, by cleaning, grading and culling and inspecting between the time of catching of the crop and its transmission to a collection station, subsequent delivery to and handling at a sorting and culling station for performing operations thereat usually performed can be obviated. Furthermore, the time which elapses as a conventional device is moved from harvesting station to harvesting station could be utilized for carrying out processing steps requiring power by employing the power plant of the tractor.

Additionally, an improved combined synergetically coacting shaker and catcher would minimize structural components beyond those taught by the prior art and would serve to provide greater efficiency and to reduce costs over conventional devices.

In accordance with the instant invention and as an object thereof, there is provided an improved device for gathering crops of trees and the like.

Another object of the instant invention is the provision of an improved tree-shaker and the like.

A further object of the instant invention is the provision of an improved combined tree crop catcher and tree shaker mechanism.

A yet further object of the invention is the provision in said combination crop gatherer and tree shaker of a sloping housing for guiding falling crop and from which said tree shaker means are retractably extendable.

A still further object of the invention is the provision in such combination crop gatherer and tree shaker of a rockable platform adapted to support an operator while connecting a tree shaker to a tree limb and the like which will rock to a sloped position to direct faling crop to a conveyor.

An additiona object of the invention is the provision of an elongated power driven frame supporting an endless driven conveyor including means for separating debris from crops and having provision adjacent said conveyor for transporting operators with the moving conveyor.

Yet a further object of the instant invention is the provision with said power driven frame of novel fruit catching means.

The foregoing and other objects, features and advantages of the present invention will become more apparent upon consideration of the following description and appended claims, when considered in conjunction with the accompanying drawings, wherein the same reference character or numeral refers to like or corresponding parts throughout the several views.

Figure 1:
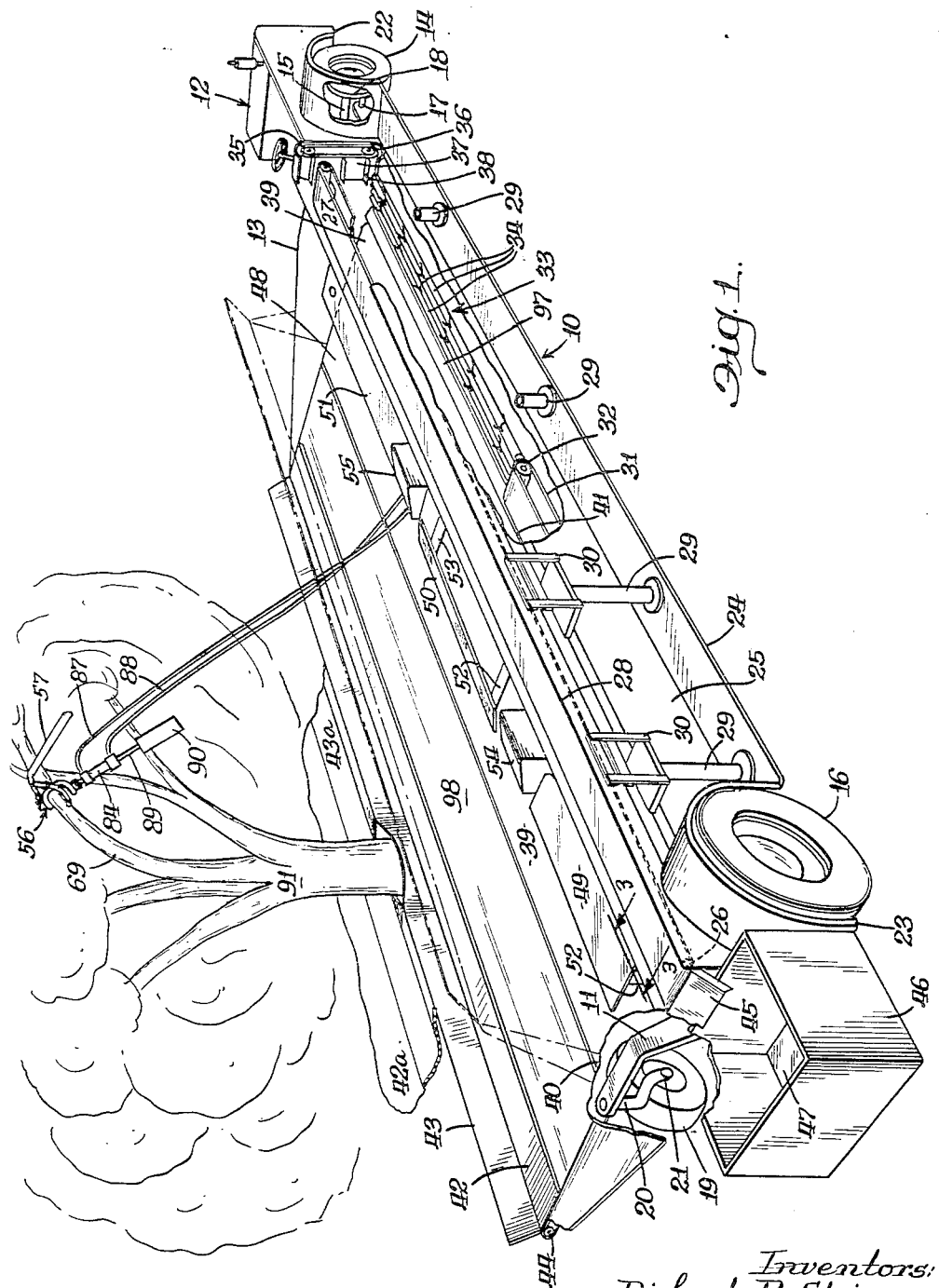
FIG. 1 is a perspective view of one embodiment of the tree crop harvesting device comprising the instant invention, parts being broken away and structures shown in dotted lines for the purpose of illustration.

Referring now more particularly to FIG. 1 of the drawings, therein is illustrated a tree crop harvester comprising an elongated body generally designated by the numeral 10, and supported on an elongated frame 11, only a portion of which is shown to the left of FIG. 1. The body 10 is power driven by suitable means such as a tractor, generally designated by the numeral 12. Said body 10 is rigidly connected to the front of said tractor 12 by means including a rigid structural component or suitable connector member 13; and said body 10 extends longitudinally from the front of said tractor 12.

In the embodiment shown, the tractor 12 has a rear traction or drive wheel 14 which is mounted on an axle 15. A second drive or traction wheel 16 is suitably mounted in any conventional fashion on a forward end of the frame 11. Both traction wheels or drive wheels 14 and 16 may be power steerable. It is observed that the drive or traction wheels 14 and 16 are disposed on the left or outer side of the illustrated harvester.

Preferably the tractor engine (not shown) drives a hydraulic pump (not shown) which, in any conventional manner or by conventional means, is operably connected to drive a pair of hydraulic motors 17 which are operably connected to the transmission mounted in the hubs 18 of the drive wheels 14 and 16, respectively. Only the hydraulic motor 17 operably connected to the rear wheel transmission 18 is shown in the drawings.

The body 10 may be supported by a pair of caster wheels 19, only the forward of which is shown in the drawings. The caster wheels 19 are mounted along the inner side of the frame 11 and are adapted to pivot 360° to facilitate maneuverability of the device toward a tree to be engaged.

The caster wheel 19 shown is adapted to rotate or pivot 360° by reason of arm 20, the upper end of which is journalled in the frame 11, as illustrated to the left of FIG. 1. The lower end of said arm 20 carries or supports an axle pin 21 on which the shown caster wheel 19 is suitably mounted for rotation.

The drive wheels 14 and 16 are covered by fenders identified by numerals 22 and 23, respectively. Said fenders 22 and 23 are arcuate in the design of conventional fenders. The lower facing end portions of fenders 22 and 23 are disposed at the opposite ends of a side or running board 24 to which they may be secured. The side or running board extends in a substantially horizontal plane at one side of the body 10 between the fenders 22 and 23.

The lower end portion of a vertically disposed elongated riser 25 is preferably secured and extends upwardly from the running or side board 24 substantially for the entire length of the body 10.

A pair of opposed conveyor drive rollers 26 and 27 are suitably journalled in body 10. The conveyor drive rollers 26 and 27 are disposed in spaced apart relationship longitudinally of the body 10 at opposite ends of the riser 25 from which they extend at right angles. An endless conveyor 28 is mounted on the driving rollers 26 and 27 in driving relationship therewith. The upper course of said conveyor 28 extends at right angles from the top of the riser 25 with respect to which said conveyor is disposed in table-like relationship longitudinally of said riser 25, as illustrated in FIG. 1.

A plurality of vertical pins or stands 29, the lower end portions of which are suitably mounted on the running or side board 24, are disposed in spaced apart relationship longitudinally of the body 10. A rotatable seat or body supporting framework 30 adapted to support an inspector or operator in seated position adjacent the upper flight of the conveyor 28 is mounted on the upper end portion of each of the stands 30, as illustrated in FIG. 1.

The conveyor 28 is superposed with respect to an endless belt conveyor 31. The conveyor 31 is mounted upon conveyor drive rollers 32, only one of which is shown in the drawings, the drive rollers 32 being suitably supported in the frame in any suitable fashion. In the embodiment shown in FIG. 1, the endless conveyor 31 may extend for about half the length of the device from the forward end to the approximate transverse mid-line of the body 10.

A cleaning roller conveyor bed, generally designated by numeral 33, comprises a plurality of elongated adjacent rollers 34. Rollers 34 extend longitudinally of frame 10 from the rear end of conveyor 31. They are suitably journalled in the frame 11 in a manner that adjacent rollers rotate in opposite directions to each other whereby debris and other material is carried from the bed 33 beneath the rollers 34 for discard from the body 10.

Rollers 34 are disposed slightly below the top course or flight of the belt conveyor 31 so that material conveyed therby will be deposited on top of the cleaning rollers 34.

A pair of vertically spaced apart drivable belt rollers 35 and 36, suitably journalled in the body 10, operably engage an endless elevator 37 having transverse horizontal flights 38. The elevator 37 is disposed generally vertically slightly to the rear of the endless conveyor 28 and the rollers 34 whereby flights 38 are successively carried adjacent the rear end of the bed 33 of the roller conveyor and upwardly adjacent the rear end of the endless conveyor 28 to receive crop from the rollers 34 and deposit same on the upper course or flight of the superposed endless conveyor 28.

At the forward end of the conveyor 28, a downwardly sloping short chute 45 is mounted. Said chute 45 is adapted to lead fruit from the front end of the conveyor 28 into a collector receptacle 46 which is suitably secured adjacent body 10 with its upper opening 47 disposed in receiving alignment with the chute 45.

An elongated endless belt or web conveyor 39 extends from the front of the body to the rear of the body 10, as illustrated in the drawings. In FIG. 1, the endless belt or web conveyor 39 in labeled twice, including once at the right of said FIG. 1, to facilitate an understanding of the disposition of said belt 39. The belt or web conveyor travels in a path which is transverse to the longitudinal axis of the body 10, that is, transverse to its own longitudinal axis or from side to side. The outer or right side 40 of said belt or web conveyor lies in a line which is substantially at the same height as the height of the upper course of the conveyor 28. From said side 40, the belt or web of conveyor 39 provides an inclined surface, the lower edge portion of which 41 is substantially at the same level as the upper course of the conveyor 31. Thereby fruit and the like which falls upon the conveyor 39 is carried downwardly and inwardly toward the conveyor 31.

It is appreciated, of course, that the path of movement of the conveyor 31 as well as the path of movement of the conveyor 28 is longitudinal of the body 10, that is, transverse to the path of movement of the conveyor 39.

Now, attention is invited to FIG. 1 in which it is seen that the cleaning roller conveyors 33 do not extend laterally to the edge 41 of the conveyor 39, as does the conveyor 31. Within the space between the inner lower edge 41 of the conveyor 39 and the inner edge of the roller conveyor bed 33, an elongated sloping plate or inclined surface 97 is provided which is disposed from side to side at an angle adequate to facilitate the downward movements of fruit and the like from the inner edge of the conveyor 39 to the roller conveyor bed 33.

An elongated crop catching web 98 which extends substantially the length of the body 10 is mounted on the outside or right side of the conveyor 39. The web 98 is carried on a frame (not shown) which is pivoted or rockably mounted by suitable means known in the art adjacent the outside of the transverse conveyor 39.

The web 98 is adapted to be rocked from the solid line position shown in FIG. 1 to the dotted line or transport position in which the web 98 is held substantially vertically. Thereby, the harvester can be moved and maneuvered with facility in an orchard from one tree location to another. It is also observed that when the web 98 is in the transport or vertical position, the conveyor 28 is not obscured nor is there any interference with the conveyors 31 and 33. Accordingly, while the harvester is in the transport position shown in dotted lines in FIG. 1, operators who may occupy the seats 30 can work.

The frame (not shown) of the web 98 is preferably mounted to limit its extended position to an incline which places the web 98 in the plane of the upper course of the conveyor 39 to provide a continuous constant sloping surface.

Along the elongated outer or right edge portion of the web 98 and extending from the front to the back thereof, an apron 42 preferably fabricated from a resilient material such as rubber or the like is rigidly secured. A rockable or hinged flap 43, which is substantially the same length as the apron 42, and like the apron 42 fabricated of an elastic material such as rubber or the like, is mounted along the entire outer or right edge of said apron 42.

The flap 43 is rockable about a fixed axis provided by a hinge pin 44 or the like which is suitably secured adjacent and longitudinally of the proximal edges of the apron 42 and the flap 43, in the manner illustrated in FIG. 1.

The web 98 as well as the flap 43 may be power operated by means (not shown) suitably operably connected to the power plant of the tractor 12.

Between the riser 25 and the sloping wall formed by the inclined conveyor 39, an elongated opening 48 is formed which extends from the front to the rear of the body 10. Within said opening, a plurality of platforms or stands 49, 50 and 51 are disposed spaced apart from each other longitudinally of the body 10. The platforms or stands 49, 50 and 51 are preferably narrow in their transverse dimension and elongated longitudinally of the body 10; and each of such stands provides means for supporting an operator in an elevated position which will enable him to connect a tree shaking mechanism, to be hereinafter described, to even the highest branches of a fruit tree and the like.

Each of the platforms or stands 49, 50 and 51 is mounted on a pair of opposed arms 52 and 53, only some of which have been labeled in the drawings. Each pair of arms 52 and 53 is spaced apart longitudinally of its platform or stand and is connected thereto at its opposite ends. Arms 52 and 53 provide supports for respective of their platforms or stands 49, 50 and 51. Arms 52 and 53 are rockably mounted by any suitable means, whereby in one position, when the platforms 49, 50 and 51 are employed as stands for an operator, said platforms are horizontally disposed, and, when the platforms are not being used to support operators, they can be rocked from their horizontal positions to an incline such as shown by platform 50 to present a sloping surface against which falling fruit will be directed toward the conveyor 39. Accordingly, by reason of the foregoing, trapping of crops on the horizontal surfaces of platforms or stands 49, 50 and 51 is precluded.

Carried within the opening 48 are a plurality of shaker reel housings 54 and 55. Each of the housings 54 and 55 has an upper inclined surface which lies substantially the same plane as the surfaces of the stands or platforms 49, 50 and 51 when they are rocked to a fruit shunting position. The housings 54 and 55 are disposed between the platforms 49, 50 and 51, and when said stands or platforms are all rocked to an inclined position a substantially almost continuous flat angular crop shunting surface is provided extending longitudinally of the body 10.

Extensibly mounted within each of the housings 54 and 55 is a means, such as self-winding reels (not shown) on which are mounted hydraulic fluid lines 87 and 88 of a tree or limb shaking mechanism or shaker generally designated by the numeral 56 in FIG. 1. The tree or limb shaking mechanism or shaker 56 is shown in detail in FIG. 2.

The shaker 56 comprises an elongated arm 57 which has an inner elongated handle portion 58 and an outer bracket portion 74. The shaker includes a fixed jaw 59 which is arcuate or C-shaped.

On the outer convex surface of the upper end or clamping portion 60 of the fixed jaw 59, there is integral therewith or rigidly secured a plate, block or bracket 61. Block or bracket 61 has a slightly curved and inclined outer surface 62 by reason of which said block or bracket is substantially triangular. A plurality of external notches 63 are provided in surface 62.

The inner surface of a lug 64 is rigidly secured to or integral with a medial external convex portion 65 of the fixed jaw 59. A pin 66 extends transversely through the lug or boss 64. Said pin 66 provides a fixed axis of rotation for a movable jaw 67.

The outer portion 68 of the movable jaw 67 comprises an arcuately shaped clamp between the concavity of which and the concavity of the upper portion 60 of arm 59 a tree limb 69 or the like can be clamped. Extending inwardly from the clamping portion 68, the movable jaw 67 has a pair of spaced apart arms generally designated by the numeral 70. Each of the spaced apart arms comprises a relatively straight medial section 71 and an inner section 72 which extends inwardly and angularly from the relatively straight section 71.

The block 64 is disposed between the arms 70 with the opposite ends of the pin 66 extending through the movable jaw 67 at the juncture of arm sections 71 and 72. The non-clamping portion 73 of the fixed jaw 59 extends downwardly between the arms 70, whereby the clamping portion 68 of the movable jaw 67 is positioned between the clamping portion 60 of the fixed jaw 59 of the non-clamping portion 73 of the fixed jaw 59. By rocking the movable paw 67 on the pin 66, the distance or opening between the clamping portion 68 of the jaw 67 and the clamping portion 60 of the fixed jaw 59 can be varied to accommodate trees, limbs or branches of varying girths.

Figure 2:
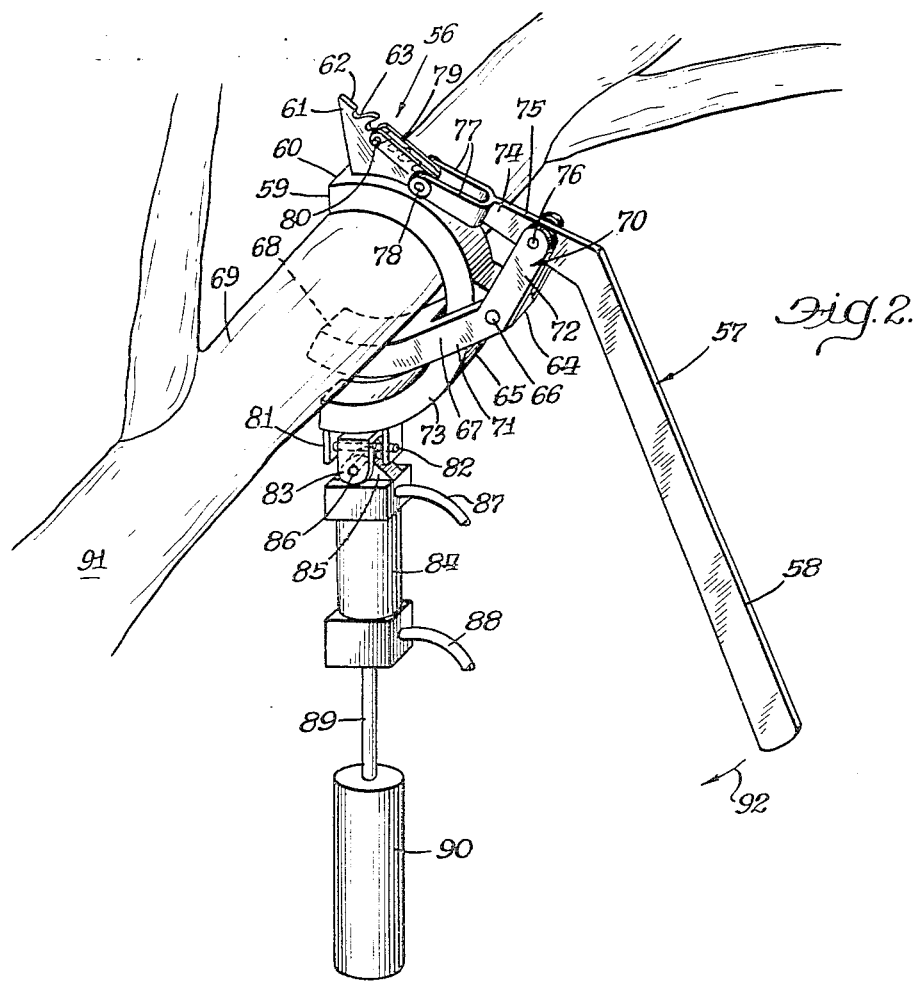
FIG. 2 is a perspective view of an embodiment of the novel tree shaking device in mounted position on a tree branch or the like, parts being shown in dotted lines for the purpose of illustration.
Figure 3:
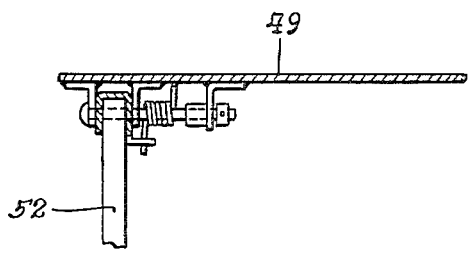
FIG. 3 is an enlarged sectional view taken substantially on line 3—3 of FIGURE 1.

As illustrated in FIG. 2, the outer end portion 74 of the arm 57 is angularly bent from the handle portion 58 and extends toward clamping portion 60 of jaw 59. A medial part 75 of said outer end portion 74 is rockably mounted between the inner arm portions 72 of movable jaw 67 by means of a pivot pin 76 which extends through said outer arm portions 72 and the therebetween section 75.

At its outermost end, the arm section 74 is bifurcated to provide a bracket, yoke or a pair of elongated spaced apart ears 77. In the outermost ends of said ears, a transversely extending pin 78 is mounted. The inner end portion of a boss 79 is rockably mounted on the pin 78 between ears 77. Said boss 79 in the form illustrated in FIG. 2 comprises a pair of spaced apart members substantially the same length as the ears 77 which extend outwardly from between said ears 77 above the notches 63. A dog or pawl-like pin 80 extending transversely of the boss 79 is mounted in the outer end portion thereof, and is adapted to releasably engage in selected of the notches 63 in the plate 61.

In essence, what has been described in connection with the shaker is an over center clamp which will permit adjustment of the jaws 59 and 67 to the proper clamping girth about a tree limb 69 or the like and then locking said jaws in adjusted position in a manner which will hereinafter be described in connection with the description of the operation of the device.

A bracket 81 comprising a pair of spaced apart ears is rigidly secured to the outer convex surface of the non-clamping portion 73 of the fixed jaw 59. A pin 82 is secured between the ears of bracket 81 and provides the axis of rotation or swivelling for a U-shaped or saddle-shaped bracket 83, the ears of which extend over the pin 82 between ears of bracket 81.

A hydraulic cylinder 84 having an outwardly extending housing portion 85 is rockably mounted between the ears of the saddle- or U-shaped bracket 83 by means of a pin 86 which extends through housing portion 85 and the ears of bracket 83. Pin 86 is disposed below and extends transversely of pin 82.

Fluid inlet and outlet lines 87 and 88 which are extended from one of housings 54 and 55 are operably connected to hydraulic cylinder 84 to operate a reciprocative rod or piston member 89 at the end of which there is carried a heavy weight 90.

By reason of the swivel connection about the pins 82 and 86, regardless of positions of the clamped jaws 68 and 60, the hydraulic cylinder and the weight 90 connected thereto will rotate, rock or swivel to depending position under gravitational pull. Such arrangement will insure that the clamped branch will be vigorously shaken as the weight 90 is reciprocated and thereby result in maximum transmission of shaking energy to the branch or limb 69 upon which the shaker 56 is clamped.

Having thus described the details of construction of the invention, a brief description of the operation of the embodiments illustrated in the drawings now ensues.

Tractor 12 will carry the elongated body 10 adjacent a tree 91, the fruit of which is to be harvested. While the harvester is approaching the tree and passing through the orchard of which the tree is a component, the web 98 is carried in the dotted line position shown in FIG. 1.

After body 10 has been maneuvered into harvesting position, the web 98 is rotated counterclockwise with respect to FIG. 1 until it reaches the limit of its downward movement, as shown in solid line in FIG. 1, and which will place it in a plane with the conveyor 39. Thereafter, flap 43 is lowered to surround or encircle approximately fifty percent of the circumference of tree 91 at the level of encirclement. The reminder of the tree 91 will be encircled by a flap 43a carried by a like and adjoining harvester body, and the apron 42a which is only partially shown in FIG. 1. It will be appreciated of course that the tractor of which the apron 42a and the flap 43a are a part faces in a direction opposite to the tractor 12.

Thereafter, the hydraulic fluid lines are drawn out of a respective of housings 54 and 55, and the shaker 56 is manually elevated to a branch or tree limb 69. The fixed jaw 59 is then mounted or hung on the branch or limb 69, the fruit from which is to be harvested. The movable jaw 68 is then adjusted by appropriate pivotal movement of the handle 58 about pivot 66 to encircle tightly the limb 69 between the fixed jaw clamp portion 60 and the movable jaw clamp portion 68.

Thus, with the limb 69 tightly gripped, the pin or pawl-like member 80 is positioned in a notch 63 into which the pin or pawl-like member 80 will normally fall. The pin 78 will then be pushed downwardly or toward the limb 69 by rocking handle 58 about pin 76. Thereby, the dog or boss 79 will be locked on the plate or block 61 in an over center grip and the movable jaw will be in rigidly clamped position.

Release of the jaw will occur when the handle 58 is rotated in the direction of the arrow 92 to force pivot pin 78 out of locked position and permit unseating of the pawl-like member 80 and accordingly release the movable jaw 67.

To elevate an operator for manual positioning of the shaker 56 and others like it, stands or platforms 49, 50 and 51 may be moved to the horizontal or body support position, being the same as that shown for the stands or platforms 49 and 51 in FIG. 1. After said platforms have been so used, they will be moved to a sloped position, such as that occupied by the stand 50, preferably by power means operated by the operator of tractor 12, through a power connection to the power plant of the tractor.

Once a limb 60 has been gripped by a catcher 56, the weight 90 will carry itself and the cylinder into a depending vertical position under the action of gravity and by reason of the swivel mounting, the construction of which has been heretofore described. In such depending position, the rod or piston 89 is reciprocated by actuation of the hydraulic cylinder 84 through control of the fluids in the lines 87 and 88 by the operator of the tractor. Such reciprocation of the weight 90 will jar the limb 69 repeatedly shaking loose crop which will fall upon either the flap 43, the sloping apron 42, the web 98, the conveyor 39, the housings 54 or 55 or the platforms 49 ,50 or 51 which will direct the crop transversely of the longitudinal axis of the device and downwardly to the upper flight or course of the conveyor 31 or to the roller bed 33.

That fruit and debris which is first carried to conveyor 31 of course will be transported to the roller bed 33. On the rollers 34, debris and other material which is delivered to the roller bed 33 with the fruit will be dragged below the rollers 34 and dropped below the body 10. On the other hand, the crop which is too large to be carried below the rollers 34 will be carried longitudinally to the rear to be deposited on successive flights 38 and thereby carried or elevated to the upper course of conveyor 28 which moves toward the front of the body 10.

Operators who occupy seats 30 then can additionally clean the crop, if required, and grade it, cull it or perform such other operations as the nature of the crop requires before the fruit is finally carried down the chute 45 and into the bin or receptacle 46. Attention is invited to the fact that all operations conventionally heretofore carried on at a separate station can be completed while the crop passes over the conveyor 28. Accordingly, it will not be necessary to do anything further with the crop than box or crate it suitably for shipment.

When the limb 69 has been shaken free of its crop, the shaker over center clamp is released in the manner heretofore described. Such action of course will leave the movable jaw 67 free to be opened by rotation about pin 66 caused by appropriate movement of handle 58. Thereafter, the hydraulic lines 87 and 88 will be reeled back into a respective of the housings 54 and 55 in which the same are stored. The flap 43 and the web 98 are then elevated to the position shown in dotted lines in FIG. 1, and the tractor 12 and the harvester body 10 attached thereto can be moved to another location.

What is interesting in this regard, of course, is that while the movement is occurring from one location or site to another, operators who are in attendance beside the conveyor 28 can continue to do their work.

From the foregoing, of course, it is understood that relatively large savings can be effectuated in labor coats when compared to costs prevailing conventionally under procedures in which crops are first caught and conveyed to a temporary storage station and thereafter carried to another station, generally outside of the orchard, for performing those procedures now capable of being carried on by and through use of the instant invention.

As many substitutions or changes could be made in the above described construction, and as many apparently widely different embodiments of the invention within the scope of the claims could be constructed without departing from the spirit and scope thereof, it is intended that all matter contained in the accompanying specification shall be interpreted as being illustrative and not in a limiting sense.

I claim:
1. A fruit catcher and conveyor apparatus comprising:
   a mobile frame adapted to be positioned adjacent to a tree to be harvested;
   a fruit catching planar surface on said frame inclined outwardly and upwardly therefrom for disposition against said tree to feed fruit toward said frame;
   a first conveyor extending longitudinally of said frame along a lower end portion of said inclined surface for conveying fruit received from said surface;
   a second conveyor extending longitudinally of said frame in superposed relation to said first conveyor; and
   elevator means on said frame for transferring fruit from said first conveyor to said second conveyor.

2. The subject matter of claim 1, wherein said first conveyor includes means for removing debris from the fruit.

3. The subject matter of claim 1, including a platform on said frame tiltable from a position supporting a standing operator to a position for deflecting falling fruit onto said inclined surface.

References Cited

UNITED STATES PATENTS

| | | | |
|---|---|---|---|
| 1,626,068 | 4/1927 | Bartlett | 56—328 |
| 2,436,648 | 2/1948 | Isom | 56—329 |
| 2,692,470 | 10/1954 | Boman | 56—328 |
| 3,218,790 | 11/1965 | Edgemond | 56—329 |

RUSSELL R. KINSEY, Primary Examiner